United States Patent [19]

Rashid

[11] Patent Number: 5,038,094
[45] Date of Patent: Aug. 6, 1991

[54] REFERENCE TRIMMING FOR A DIGITAL VOLTAGE REGULATOR

[75] Inventor: Abdul Rashid, Rockford, Ill.

[73] Assignee: Sundstrand Corporation, Rockford, Ill.

[21] Appl. No.: 445,496

[22] Filed: Dec. 4, 1989

[51] Int. Cl.$^5$ .............................................. H02P 9/00
[52] U.S. Cl. ............................................ 322/28; 322/25
[58] Field of Search ................... 322/19, 20, 22, 23, 322/24, 25, 27, 28, 29, 32, 59, 72, 73

[56] References Cited

U.S. PATENT DOCUMENTS

| | | | |
|---|---|---|---|
| 4,199,023 | 4/1980 | Phillips | 165/12 |
| 4,347,562 | 8/1982 | Galloway | 363/87 |
| 4,446,417 | 5/1984 | Fox et al. | 322/25 |
| 4,789,817 | 12/1988 | Asakura et al. | 322/28 |
| 4,807,106 | 2/1989 | Baker et al. | 322/25 X |
| 4,823,070 | 4/1989 | Nelson | 363/21 X |
| 4,933,622 | 6/1990 | Fox et al. | 322/25 X |

FOREIGN PATENT DOCUMENTS

| | | | |
|---|---|---|---|
| 0078558 | 5/1983 | European Pat. Off. | 322/28 |
| 0226700 | 12/1984 | Japan | 322/28 |

*Primary Examiner*—Steven L. Stephan
*Assistant Examiner*—Kristine Peckman
*Attorney, Agent, or Firm*—Wood, Phillips, Mason, Recktenwald & Vansanten

[57] ABSTRACT

The problem of adusting a digital reference value without modifying a program or stored memory values in a voltage regulator (60) is minimized using an analog signal generator (114). A reference loop (110) which determines a desired point of regulation voltage level receives a trim value from the analog signal generator (114) to adjust a stored reference value (112) to offset the same.

12 Claims, 3 Drawing Sheets

REFERENCE TRIMMING FOR A DIGITAL VOLTAGE REGULATOR

FIELD OF THE INVENTION

This invention relates to electrical power generating systems and, more particularly, to a digital control circuit therefor receiving an analog trimming value for trimming a reference voltage.

BACKGROUND OF THE INVENTION

A conventional electrical power generating system (EPGS) for an aircraft, in one known form, comprises an integrated drive generator including a constant speed drive and a generator. The integrated drive generator receives mechanical power at varying speed from an aircraft engine and delivers electrical power at constant frequency. The constant speed drive includes a speed control assembly and receives mechanical input power at varying speed from the aircraft engine and delivers power from its output shaft at constant speed. The generator comprises a salient pole machine with a rotating field which is excited through an exciter powered by a permanent magnet generator (PMG) through a voltage regulator. Such conventional systems use a generator control unit (GCU) to provide voltage regulation and speed regulation. Specifically, a voltage regulator provides excitation power to an exciter at levels which provide constant system voltage at the point of regulation. A speed control controls trimming of a servo valve to maintain generator speed, and thus frequency, to be constant.

Prior generator control units used either analog or digital circuits, with the choice being based on factors such as weight, size, cost and complexity of control logic. In analog systems both integrated circuits and discrete components are used and some signals are converted to digital form. However, signals are combined and perform their required functions using analog type control. Such system products incorporate standard, off-the-shelf components. Implementing a system which has the complexity of a generator control unit with standard product technology requires the use of many hundreds of electronic devices even for a relatively simple application, such as for a single channel EPGS. Each device adds additional weight to the product, including indirect weight in the form of additional circuit board area and housing needed to support the inclusion of each device. Since commercial and military aircraft are the intended end use of such products, it is desirable to minimize weight.

Further, analog circuits tend to be environmentally sensitive. For example, parameter drift results owing to changes in temperature and humidity, as well as age of the devices. Further, with analog technology the control cannot be easily changed. Instead, circuit components must be modified resulting in custom design for each different application.

In digital control systems, conversely, all signals are converted to digital form and the control and protection functions are controlled by a microprocessor. As such, the control system is inherently more flexible in implementing different control schemes. In a digital control system the control unit contains a microprocessor and associated software and continuously and sequentially checks for proper system conditions and for control commands, and performs the automatic or command and control functions. However, the actual flexibility available with such a digital system is limited due to limitations in processing time available in the microprocessor for performing both control and protection functions. In fact, known GCU systems employ an analog control for implementing the voltage regulator functions. As a result, it is necessary to provide circuit components associated with voltage regulation.

Additional problems result in the design of generator control units. In each application it is necessary to develop a cost effective, lightweight solution. Therefore, the designer must start from "scratch" in designing a generator control unit for each new application. This results in each generator control unit being custom made and therefore more expensive.

Analog type control systems often utilize potentiometers for setting a reference value, such as the desired voltage at the point of regulation. Typically, the potentiometer forms part of a voltage divider network with variations in the resistance being used to adjust the reference voltage. Such a potentiometer tends to be highly sensitive in that the range of potentiometer adjustment is used for full scale variation in voltage reference which may be on the order of, for example, 115 volts. Thus, it is difficult to fine tune the reference value.

In a typical electrical power generating system in an aircraft, the point of regulation voltage reference is set at 115 volts. Under certain operating conditions, though, the steady state voltage may be offset and may actually be, for example, 114 volts. Although the reference value could be adjusted to bring the output voltage up to the desired level, advantageously the voltage reference should be maintained at its desired value.

The present invention is directed to overcoming one or more of the problems discussed above.

SUMMARY OF THE INVENTION

In accordance with the invention, a generator control unit is provided with a digital control circuit using a reference value and means for biasing the reference value in accordance with a reference trimming value.

Broadly, there is disclosed herein a generator control unit (GCU) for an electrical power generating system having a generator, with means responsive to a control signal for varying generator output voltage. A digital control circuit includes a processor having a memory circuit, the processor being responsive to system condition inputs for establishing a parameter of the control signal in accordance with an algorithm. The algorithm implements a control loop comparing system condition inputs with a reference value to maintain generator output voltage at a desired voltage level. A memory circuit stores the algorithm and the reference value. Means are operatively associated with the processor for receiving a reference trimming value, the control loop biasing the reference value in accordance with the reference trimming value.

In one aspect, the GCU further comprises a trimming potentiometer operatively connected to the processor for generating the reference trimming value.

According to another aspect the GCU further comprises an analog to digital converter circuit connected between the trimming potentiometer and the processor.

It is a feature of the invention that the memory circuit includes a programmable memory circuit storing the reference value.

It is another feature of the invention that the digital control circuit further comprises an interface circuit operatively connected to the processor for connection to an external circuit which receives a signal representing the reference trimming value to be stored in the memory circuit.

It is a further feature of the invention that the external circuit comprises an analog to digital converter circuit which receives an analog signal representing the reference trimming value.

It is a further feature of the invention that the digital control circuit further comprises an interface circuit operatively connected to the processor for receiving signals representing the system condition inputs and the reference trimming value.

There is disclosed herein according to another aspect of the invention a generator control unit for an electrical power generating system having a generator, with means responsive to a first control signal for varying generator output power, and a drive for the generator, with means responsive to a second control signal for varying the generator speed. The GCU comprises a digital control circuit including a processor and a memory circuit. The processor is controlled by a program stored in the memory circuit to implement control loops comparing system condition inputs with reference values stored in the memory circuit to maintain generator output voltage as a desired voltage level and frequency. Means are provided for generating a trim signal representing a reference offset. Means are operatively coupled between the processor and the generating means for receiving the trim signal, the control loop biasing one of the reference values in accordance with the reference offset to trim generator output voltage.

In one form, the reference offset is used to bias generator output voltage level.

In another form, the reference offset is used to bias generator output frequency.

More specifically, the generator control unit includes a voltage regulator and a speed control each implemented in a digital control circuit which includes several control loops for controlling generator output voltage level and frequency, respectively. Each of the control loops is controlled in accordance with a reference or setpoint value. These values are represented by a word in memory and may be received from a microprocessor, or be a permanently stored program value. In certain circumstances, it may be necessary to adjust a reference value without modifying the program.

As disclosed herein, a potentiometer is used as an analog input through an A-D converter to the voltage regulator circuit or the speed control circuit. The particular circuit converts the voltage from the potentiometer to a digital value representing an offset or trimming amount to be added or subtracted to the stored digital setpoint value.

Further features and advantages of the invention will readily be apparent from the specification and from the drawings.

DESCRIPTION OF THE INVENTION

Figure 1:
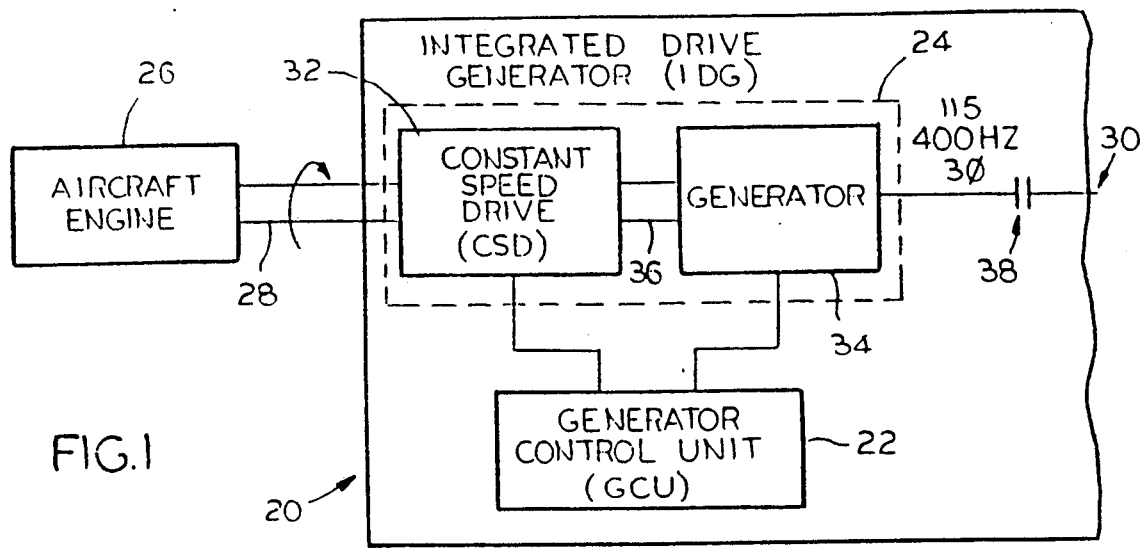
FIG. 1 is a simplified block diagram for an aircraft electrical power generating system (EPGS) including a generator control unit using a reference trimming potentiometer according to the invention.

With reference to FIG. 1, a block diagram representation illustrates an electrical power generating system (EPGS) 20 including a generator control unit (GCU) 22 according to the invention. In the illustrated embodiment, the EPGS 20 is used in an aircraft for providing power to aircraft loads. The GCU 22 could be used in connection with various other generating systems, as is obvious to those skilled in the art.

In addition to the GCU 22, the EPGS 20 includes an integrated drive generator (IDG) 24. The IDG 24 receives mechanical power at varying speed from an aircraft engine 26 through a rotating shaft 28 and delivers electric power at constant frequency at a power bus 30. The IDG 24 includes a constant speed drive 32 and a generator 34. The constant speed drive 32 receives mechanical input power from the shaft 28 at varying speed and delivers mechanical power from its output shaft 36 at constant speed. The generator 34 is driven by the shaft 36 and develops electrical output power through suitable fault protection circuits represented by a generator relay or contactor, illustrated schematically at 38, to the bus 30.

Figure 2:
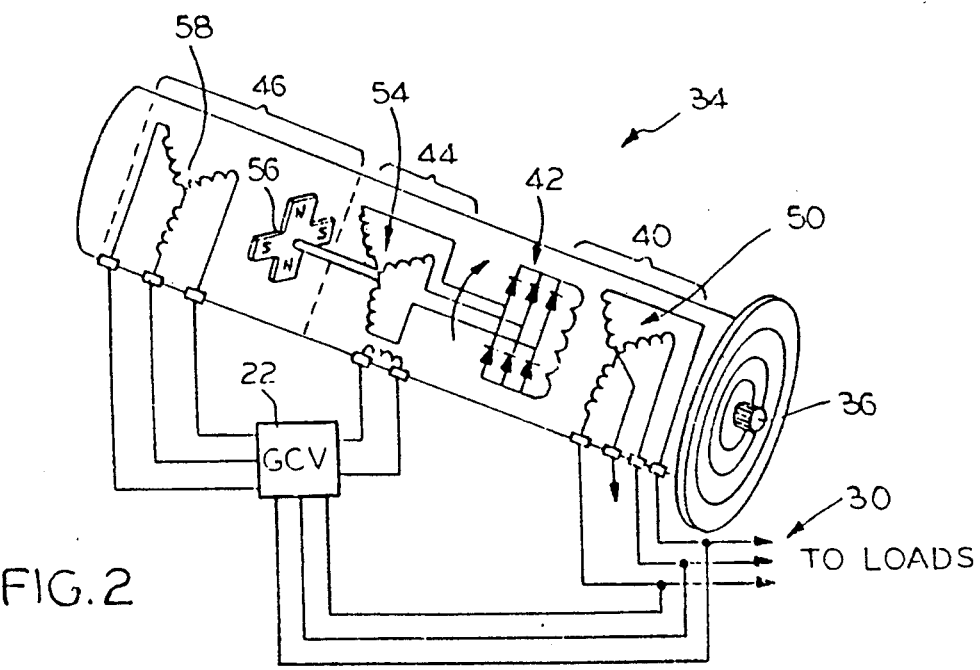
FIG. 2 is a combined schematic and perspective view of an EPGS generator.

With reference also to FIG. 2, the generator 34 includes a main generator 40, a rotating rectifier bridge assembly 42, an exciter 44 and a permanent magnet generator (PMG) 46. Each of the main generator 40, exciter 44 and PMG 46 includes a rotor driven by the constant speed drive 32 via the common shaft 36. As is well known, the generator 34 may be mounted in a common housing with the constant speed drive 32 and, more specifically, may be mounted in line or side-by-side, as is necessary or desired.

The main generator 40 is a salient pole machine having a rotating field producing output power at a frequency of 400 Hz. Particularly, a four pole machine is used at 12,000 rpm, while a two pole machine is used at 24,000 rpm. The main generator 40 includes a rotor carrying a DC field winding 48, and a stator carrying a polyphase AC armature winding 50.

The exciter 44 is a multi-pole salient pole machine which provides excitation to the main generator 40. The exciter 44 includes a stator carrying a DC field winding 52 and a rotor carrying a polyphase AC armature winding 54. The armature winding 54 is connected through the rotating rectifier bridge assembly 42 to the main armature DC field winding 48.

The PMG 46 is a pilot generator in which field flux is provided by a permanent magnet 56 mounted on a rotor driven by the shaft 36 and which is magnetically coupled with a polyphase stator armature winding 58.

The PMG stator winding 58 is connected through the GCU 22 to the exciter DC field winding 52. Although not specifically illustrated herein, the GCU 22 includes a rectifier which converts the polyphase AC power from the PMG stator winding 58 to DC power which is regulated to drive the exciter DC field winding 52.

As is conventional in brushless power generators, rotation of the shaft 36 by the aircraft engine 26 through the constant speed drive 32, and a gearbox, not shown, results in generation of a polyphase voltage in the exciter armature windings 54 as they traverse the magnetic field set up by the exciter DC field winding 52. This polyphase voltage is rectified by the rotating rectifier bridge assembly 42, and the rectified power is coupled to the main generator field winding 48. The current in the main generator field winding 48 and the rotation of the shaft 36 sets up a rotating magnetic field in space occupied by the main generator stator windings 50. The stator windings 50 develop polyphase output power at constant frequency which is delivered to the AC bus 30 for powering loads.

Figure 3:
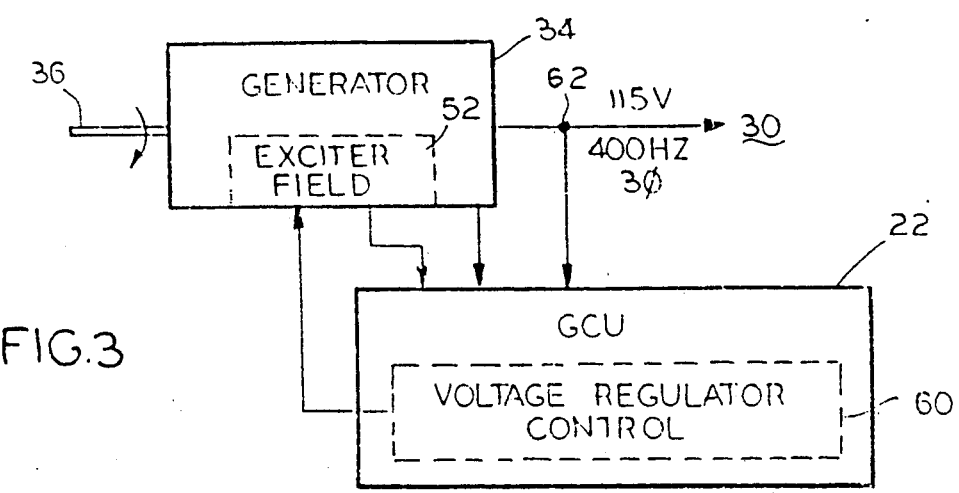
FIG. 3 is a simplified block diagram of a voltage regulator control loop.

With reference also to FIG. 3, a block diagram illustrates a control loop for regulating excitation to the exciter DC field winding 52. Specifically, a voltage regulator control 60 in the GCU 22 controls generator output voltage at a point of regulation (POR) as sensed by a voltage sensor 62 by regulating the energy coupled from the exciter field winding 52 to the exciter armature winding 54 and ultimately to the main generator 40.

Figure 4:
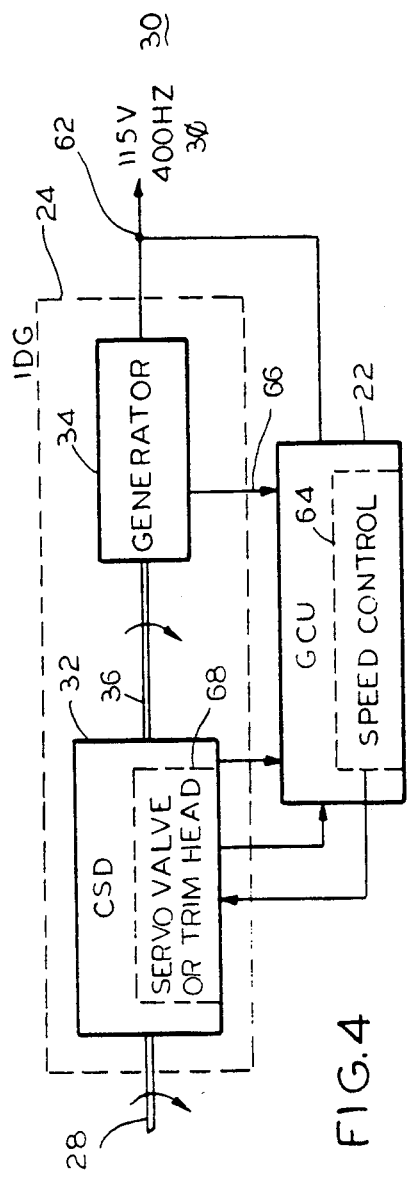
FIG. 4 is a simplified block diagram of a speed control loop.

With reference also to FIG. 4, a block diagram illustrates a speed control loop for controlling output speed of the constant speed drive 32. The GCU 22 includes a speed control 64 which receives a frequency signal on a line 66 from the generator 34. As is well known, the frequency of the power on the line 66 is representative of speed of the shaft 36. The speed control 64 alters the position of a servo valve or trim head 68 in the constant speed drive 32 in order to maintain a constant output speed on the shaft 36 and thus frequency at the point of regulation.

Figure 5:
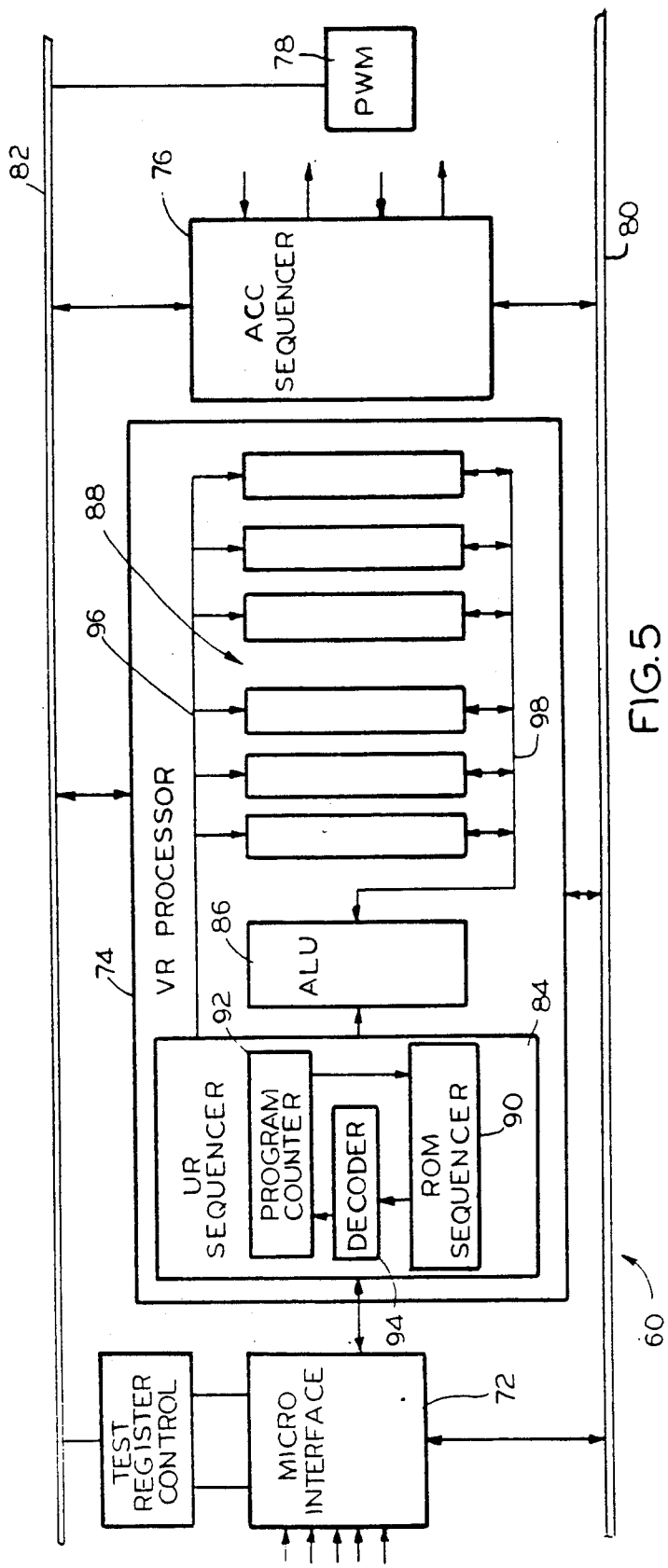
FIG. 5 is a block diagram for a digital voltage regulator circuit.

With reference to FIG. 5, a generalized block diagram illustrates the architecture of the circuit implementation for the voltage regulator 60. The principal circuit function elements comprise a processor interface circuit 72, a processor 74, an analog control circuit sequencer 76 and a pulse width modulation drive circuit 78 which communicate on an address bus 80 and a data bus 82.

In the illustrated embodiment, the voltage regulator 60 uses custom very large scale integration (VLSI) technology to reduce size, weight, life cycle costs and improve reliability. Specifically, owing to the use of VLSI technology, the overall GCU 22 can be built utilizing relatively fewer parts at a lower weight, as compared to conventional GCU's, and having signal level circuits that are general purpose so that they can be employed in all GCU applications without hardware redesign. The voltage regulator circuit 60 and speed control circuit 64 comprise custom digital chips. The voltage regulator chip 60 and speed control chip 64 comprise 1.25 micron technology utilizing 74K and 100K transistors, respectively, and are designed to function using a 10 MHz clock signal.

The processor interface circuit 72 is an interface module that controls the data transfer between a system microprocessor, not shown, and the voltage regulator 60. Such a microprocessor in the environment of a generator control unit is illustrated and described in Parro U.S. patent application Ser. No. 432,596, filed Nov. 7, 1989, and entitled "Generic Control Unit", which is owned by the assignee of the present invention and the specification of which is hereby incorporated by reference herein.

Programmable and readable registers and RAM memory within the voltage regulator 60 are mapped to a memory address interface with the system microprocessor for chip initialization, built-in-test function, debug and test operations. Microprocessor interface operations to the voltage regulator 60 are primarily performed during chip initialization which takes place immediately after system reset.

The voltage regulator processor 74 interfaces with all of the other voltage regulator circuits and performs all calculations and temporary storage of internal variables. The components of the processor 74 are a sequencer 84, an arithmetic logic unit (ALU) 86, and a plurality of memory circuits 88. The sequencer 84 controls operation of the loop functions in the voltage regulator. Any of the loop functions, namely load division, current limit, high phase takeover, POR average, and the main loop including an exciter field feedback current, can be accessed by the sequencer 84. The sequencer 84 sends out a request, the loop function then performs its task, and returns an acknowledge flag for completion. The sequencer's algorithm* is centered around the POR average voltage, as discussed below.

The sequencer 84 includes a ROM based sequencer 90 controlled by a program counter 92. The ROM based sequencer 90 implements the control loops and filter control. A decoder 94 receives information from the ROM based sequencer 90, the microprocessor interface 72 and through internal multiplexer circuits (not shown) for communicating with the program counter 92 which sends stepping instructions to the ROM based sequencer 90. The multiplexer circuit also sends out requests from the sequencer internally within the processor 74.

The arithmetic logic unit 86 is used to perform fixed point multiplication, addition, subtraction, etc. The sequencer 84 and arithmetic logic unit 86 communicate with the voltage regulator memory 88 via an internal address bus 96 and data bus 98. The memory 88 is divided into a first section containing constants and a second section containing variables generated by the voltage regulator processor 74.

Figure 6:
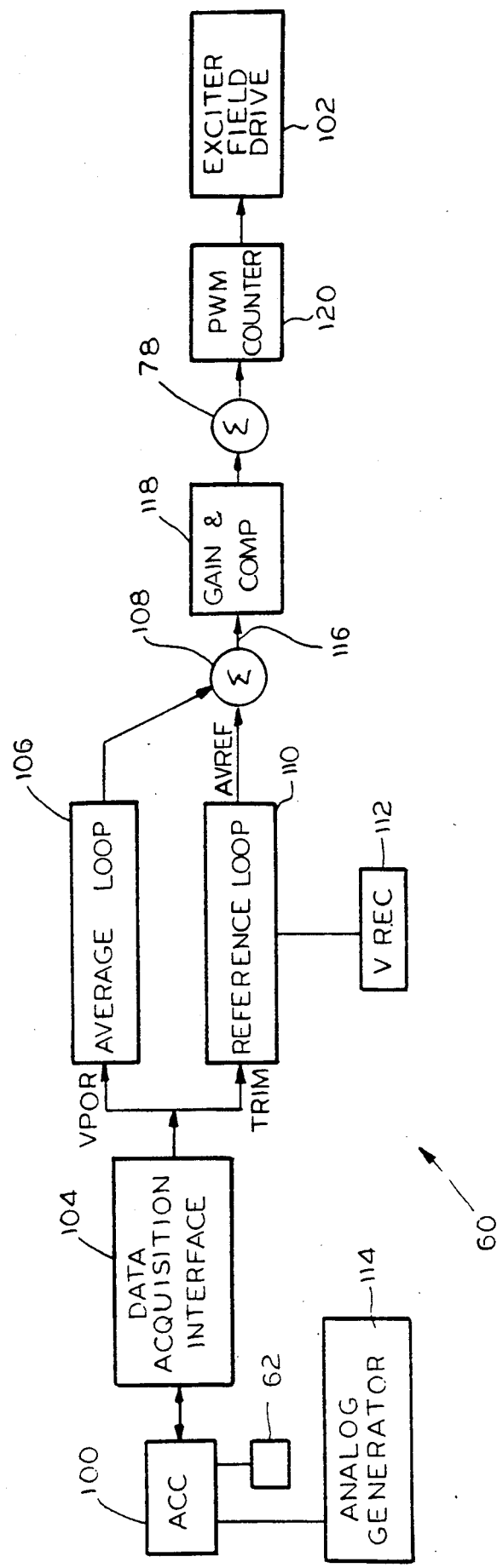
FIG. 6 is a detailed block diagram of the control loops implemented in the voltage regulator of FIG. 3.

The ACC sequencer circuit 76 is used to provide an interface to an external analog control circuit 100, see FIG. 6. Specifically, the ACC sequencer 76 is a ten-bit interface which communicates with a ten-bit analog/-digital converter, and a multiplexer consisting of twelve channels of the analog control circuit 100.

The PWM circuit 78 is a peripheral circuit which is free-running and generates a completion flag to update information. The PWM circuit 78 provides a controlling output to the exciter field 52 via a drive circuit 102, see FIG. 6, for voltage regulation of the system voltage. It accepts the calculated input from the voltage regulator loops which determine the characteristics of the square wave output.

With reference to FIG. 6, a block diagram illustrates the control loops implemented in the sequencer 85 of FIG. 5. The generator's three phase voltage signals are sensed at the point of regulation by sensors 62, see FIG. 3, are conditioned by the analog control circuit 100 and are then sampled by the voltage regulator 60 via a data acquisition interface 104. This information is processed by an average loop 106 and applied to a summer 108 which also receives a reference value from a reference loop 110.

The reference loop 110 receives a setpoint value VREF generated at a block 112. In the illustrated embodiment, the value VREF is a memory stored value which may be loaded, for example, at initialization. An analog signal generator, such as a potentiometer, 114 is also coupled to the analog control circuit 100 and is sampled by the data acquisition interface 104 to develop a trimming value, referred to herein as TRIM, which is also applied to the reference loop 110. Specifically, the value TRIM is a potentiometer adjustment or trim value to the setpoint VREF. The reference loop 110 adds or subtracts the trim value from the voltage reference VREF to develop an adjusted voltage reference value AVREF which is also applied to the summer 108. The summer 108 calculates an error on a line 116 representing the difference between the POR voltage input and the adjusted POR voltage reference. The error is filtered by a gain and compensation function block 118 to allow for stable operation, yet have suitably fast transient response over all operating conditions. The filtered error is applied to a PWM counter 120 to alter the PWM duty cycle of the exciter field drive switching circuit 102 which in turn varies the field current to the exciter field winding 52, see FIG. 3 to vary generator output power.

The analog generator 114 is used if it is necessary to adjust the reference value VREF without modifying the stored memory value. For example, if the POR voltage setpoint is 115 volts and the actual sustained output is 114 volts, then it is necessary to increase the actual setpoint to the summer 108 so that the actual voltage increases to satisfy the 115 volt requirement.

The algorithm for implementing the voltage regulation loops is downloaded from the system microprocessor at initialization, along with the constants required for implementing the same, such as setpoints and gain and compensation variables, and is stored in the memory circuits 88, see FIG. 5, for access by the sequencer 84, as is conventional in sequencer controlled systems.

Although the disclosed circuit utilizes a potentiometer as the analog generator, various other analog signal devices, or any device which develops a signal which can be used by the program for trimming may be used, as is obvious to those skilled in the art.

The reference trimming potentiometer could also be used for trimming the frequency or speed setpoint to the speed control 64, as will be apparent.

Thus, the invention broadly comprehends the use of a potentiometer or other varying signal source as a bias for a digital reference value.

The foregoing embodiment is illustrative of the broad inventive concepts contemplated by the invention.

I claim:

1. A generator control unit for an electrical power generating system (EPGS) having a generator, with means responsive to a control signal for varying generator output voltage, comprising:
   a digital control circuit including a processor having a memory circuit, said processor being responsive to system condition inputs for establishing a parameter of the control signal in accordance with an algorithm, which algorithm implements a control loop comparing the system condition inputs with a reference value, to maintain the generator output voltage at a desired voltage level, and said memory circuit storing said algorithm and said reference value; and
   means operatively associated with said processor for receiving a reference trimming value, said control loop biasing the reference value in accordance with the reference trimming value.

2. The generator control unit of claim 1 further comprising a trimming potentiometer operatively connected to said processor for generating said reference trimming value.

3. The generator control unit of claim 2 further comprising an analog to digital converter circuit connected between said trimming potentiometer and said processor.

4. The generator control unit of claim 1 wherein said memory circuit includes a programmable memory circuit storing said algorithm and said reference value.

5. The generator control unit of claim 1 wherein said digital control circuit further comprises an interface circuit operatively connected to said processor for connection to an external circuit which receives a signal representing said reference trimming value to be stored in said memory circuit.

6. The generator control unit of claim 5 wherein said external circuit comprises an analog-to-digital converter circuit which receives an analog signal representing said reference trimming value.

7. The generator control unit of claim 1 wherein said digital control circuit further comprises an interface circuit operatively connected to said processor for receiving signals representing said system condition inputs and said reference trimming value.

8. A generator control unit for an electrical power generating system (EPGS) having a generator, with means responsive to a first control signal for varying generator output power, and a drive for the generator, with means responsive to a second control signal for varying the generator speed, comprising:
   a digital control circuit including a processor and a memory circuit, said processor being controlled by a program stored in said memory circuit to implement control loops comparing system condition inputs with reference values stored in said memory circuit to maintain generator output voltage at a desired voltage level and frequency;
   means for generating a trim signal representing a reference offset; and
   means operatively coupled between said processor and said generator means for receiving the time signal, said control loop biasing one of the reference values in accordance with the reference offset to vary the generator output voltage.

9. The generator control unit of claim 8 wherein said generating means comprises a trimming potentiometer.

10. The generator control unit of claim 9 further comprising an analog-to-digital converter circuit connected between said trimming potentiometer and said receiving means.

11. The generator control unit of claim 8 wherein said memory circuit includes a programmable memory circuit storing said program and said reference value.

12. The generator control unit of claim 8 wherein said receiving means comprises an interface circuit operatively connected to said processor for receiving signals representing said system condition inputs and said reference offset.

* * * * *